US012353852B2

(12) United States Patent
Hill et al.

(10) Patent No.: US 12,353,852 B2
(45) Date of Patent: Jul. 8, 2025

(54) SYSTEMS AND METHODS FOR ACTION VALIDATIONS

(71) Applicant: Palantir Technologies Inc., Denver, CO (US)

(72) Inventors: Alexander Hill, New York, NY (US); Andy Chen, New York, NY (US); Vidit Gupta, London (GB); Eugene Robinson, London (GB)

(73) Assignee: Palantir Technologies Inc., Denver, CO (US)

( * ) Notice: Subject to any disclaimer, the term of this patent is extended or adjusted under 35 U.S.C. 154(b) by 59 days.

(21) Appl. No.: 18/113,719

(22) Filed: Feb. 24, 2023

(65) Prior Publication Data
US 2023/0273800 A1  Aug. 31, 2023

Related U.S. Application Data

(60) Provisional application No. 63/314,812, filed on Feb. 28, 2022.

(51) Int. Cl.
*G06F 16/21* (2019.01)
*G06F 8/34* (2018.01)
*G06F 8/41* (2018.01)
*G06F 16/22* (2019.01)
(Continued)

(52) U.S. Cl.
CPC .............. *G06F 8/34* (2013.01); *G06F 8/436* (2013.01); *G06F 16/21* (2019.01); *G06F 16/22* (2019.01); *G06F 16/25* (2019.01); *G06F 16/28* (2019.01)

(58) Field of Classification Search
CPC ............ G06F 8/34; G06F 8/436; G06F 16/21; G06F 16/22; G06F 16/25; G06F 16/28
See application file for complete search history.

(56) References Cited

U.S. PATENT DOCUMENTS 6,640,231 B1 * 10/2003 Andersen ................ G06F 16/30
707/999.102
7,343,364 B2 * 3/2008 Bram ................ G06F 16/24528
706/46

(Continued)

OTHER PUBLICATIONS

Matilda Sjoblom et al., Towards the Desired Experience for Custom Applications in Analytical Software, 2021, [Retrieved on Jan. 23, 2025]. Retrieved from the internet: < URL: https://odr.chalmers.se/items/7af5f329-1035-4383-b0e4-7ff6ef359ba4> 163 Pages (1-163) (Year: 2021).*

Primary Examiner — Anibal Rivera
(74) Attorney, Agent, or Firm — Faegre Drinker Biddle & Reath LLP

(57) ABSTRACT

Systems and methods for validations related to software. In some embodiments, a method for building software with software action validations, the method comprising: accessing a target object type, the target object type comprising one or more object properties; accessing an action type, the action type comprising one or more action parameters, the action type associating with editing a target object of the target object type; generating a set of validation rules associated with the action type, wherein the set of validation rules comprise a local validation rule associated with a rule parameter; and building a software application, wherein the software application comprises the target object type, the action type, and the set of validation rules.

18 Claims, 8 Drawing Sheets

(51) Int. Cl.
    *G06F 16/25*     (2019.01)
    *G06F 16/28*     (2019.01)

(56) References Cited

U.S. PATENT DOCUMENTS

| | | | |
|---|---|---|---|
| 8,739,150 B2 * | 5/2014 | Gass | G06F 8/36 |
| | | | 717/173 |
| 11,726,760 B2 * | 8/2023 | Gass | G06F 8/65 |
| | | | 717/136 |
| 2020/0349130 A1 * | 11/2020 | Bracholdt | G06F 16/254 |
| 2021/0303441 A1 * | 9/2021 | Hazra | G06F 11/3612 |

* cited by examiner

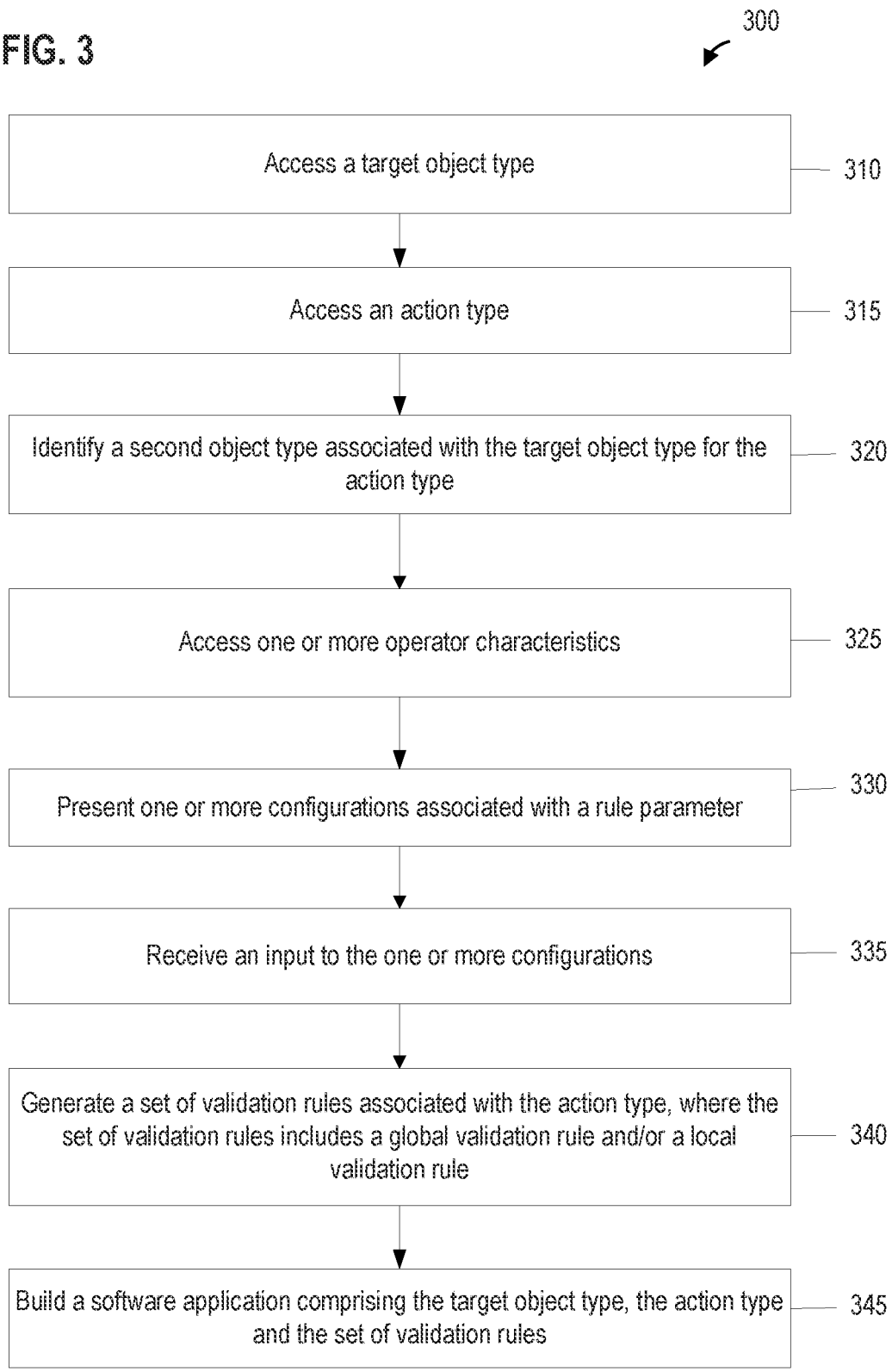

SYSTEMS AND METHODS FOR ACTION VALIDATIONS

CROSS REFERENCE TO RELATED APPLICATIONS

This application claims priority to U.S. Provisional Application No. 63/314,812 filed Feb. 28, 2022, incorporated by reference herein for all purposes.

TECHNICAL FIELD

Certain embodiments of the present disclosure are directed to systems and methods for validations related to software. More specifically, some embodiments of the present disclosure relate to systems and methods for validations related to software actions applicable to objects.

BACKGROUND

Many enterprises and organizations use software and software systems in operations. In some examples, validations are needed for operations implemented using the software systems.

Hence it is desirable to improve the techniques for validations related to software.

SUMMARY

Certain embodiments of the present disclosure are directed to systems and methods for validations related to software. More specifically, some embodiments of the present disclosure relate to systems and methods for validations related to software actions applicable to objects.

At least some aspects of the present disclosure are directed to methods for building software with software action validations. In certain embodiments, a method comprises: accessing a target object type, the target object type comprising one or more object properties; accessing an action type, the action type comprising one or more action parameters, the action type associating with editing a target object of the target object type; generating a set of validation rules associated with the action type, wherein the set of validation rules comprise a local validation rule associated with a rule parameter, wherein the rule parameter is corresponding to at least one selected from a group consisting of the one or more object properties of the target object type, the one or more action parameters of the action type, and one or more object properties of a second object type associated with the action type, wherein the second object type is different from the target object type; and building a software application, wherein the software application comprises the target object type, the action type, and the set of validation rules; wherein the method is performed using one or more processors.

In certain embodiments, a system for building software with software action validations, the system comprises: one or more memories comprising instructions stored thereon; and one or more processors configured to execute the instructions and perform operations comprising: accessing a target object type, the target object type comprising one or more object properties; accessing an action type, the action type comprising one or more action parameters, the action type associating with editing a target object of the target object type; generating a set of validation rules associated with the action type, wherein the set of validation rules comprise a local validation rule associated with a rule parameter, wherein the rule parameter is corresponding to at least one selected from a group consisting of the one or more object properties of the target object type, the one or more action parameters of the action type, and one or more object properties of a second object type associated with the action type, wherein the second object type is different from the target object type; and building a software application, wherein the software application comprises the target object type, the action type, and the set of validation rules.

In some embodiments, a method for software action validations, the method comprises: accessing a target object of a target object type, the target object type comprising one or more object properties; receiving data associated with an action of an action type, the action type comprising one or more action parameters, the action type associating with editing an object of the target object type; and validating the action using a set of validation rules associated with the action type, wherein the set of validation rules comprise a local validation rule associated with a rule parameter, wherein the rule parameter is corresponding to at least one selected from a group consisting of the one or more object properties of the target object type, the one or more action parameters of the action type, and one or more object properties of a second object type associated with the action type, wherein the second object type is different from the target object type; wherein the method is performed using one or more processors.

BRIEF DESCRIPTION OF THE DRAWINGS

The accompanying drawings are incorporated in and constitute a part of this specification and, together with the description, explain the features and principles of the disclosed embodiments. In the drawings.

FIG. 3 is a simplified diagram showing a method for building a software application with action validations according to certain embodiments of the present disclosure;

FIGS. 4A-4C are example user interfaces of an operation software design system, in accordance with certain embodiments of the present disclosure;

DETAILED DESCRIPTION

Figure 1:
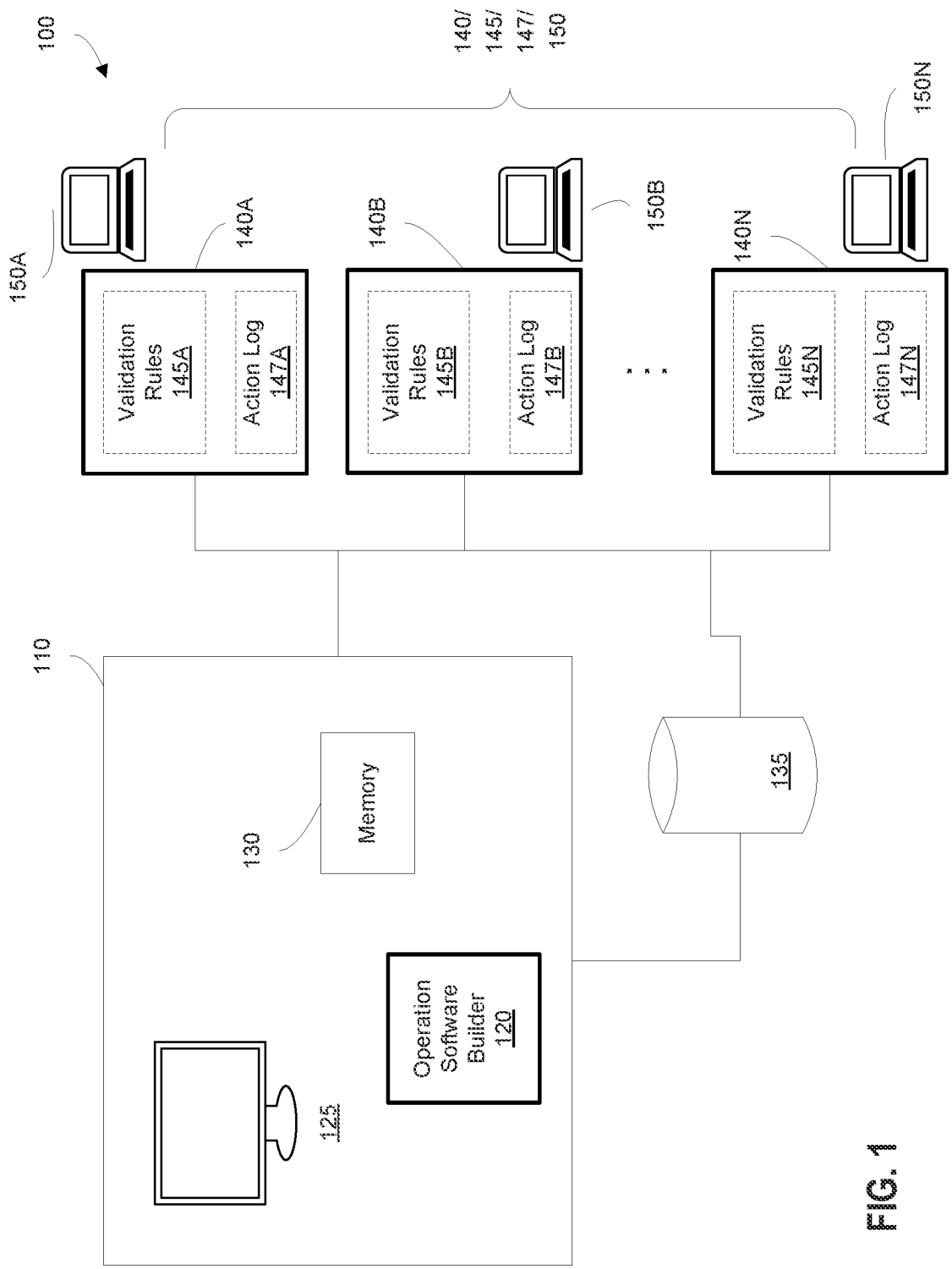
FIG. 1 depicts an illustrative diagram of an operation software environment, in accordance with certain embodiments of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, certain some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information.

At least some embodiments of the present disclosure are directed to systems and methods for encoding processing logic (e.g., business logic) into permissions models in object relational data modeling. In certain embodiments, the system for validating actions can decouple data visibility from data editing permission. As used herein, an action refers to one or more processing logics applied to one or more objects including, for example, creating objects, changing objects, combining objects, linking objects, deleting objects, and/or the like. In some embodiments, separating visibility from permission can allow some users to edit related data but prevent broad visibility.

At least some embodiments of the present disclosure are directed to systems and methods for defining a permission model that joins processing logic with pre-defined user groups, so that the determination whether to allow changes to an object relational data model relies both on user classification and the specific edit that the user is proposing to the object relational data model. Certain embodiments of the present disclosure describe how to incorporate processing logic into permissions models. For instance, the range of allowed values to an action data can vary based upon the user's status within an organizational hierarchy. In some embodiments, systems and methods for validating actions include one or more validation rules to govern changes to edits in an object-relational data model. In certain embodiments, systems and methods for validating action can improve conventional permission models that rely on permissions.

In certain embodiments, an application builder directly connects application assets (e.g., application components, frontend components) to objects and links in an ontology. As used herein, an ontology refers to a structural framework (e.g., data model) containing information and data related to objects and relationships of objects (e.g., functions applicable to objects, links) within a specific domain (e.g., an organization, an industry). In some embodiments, an application includes one or more actions taken on one or more objects or among objects using an object-relational data model.

FIG. 1 depicts an illustrative diagram of an operation software environment 100, in accordance with certain embodiments of the present disclosure. FIG. 1 is merely an example. One of ordinary skill in the art would recognize many variations, alternatives, and modifications. According to certain embodiments, the operation software environment 100 includes an operation software design system 110, ontology data depository 135, and operation software 140 (e.g., operation software 140A, operation software 140B, . . . operation 140N) on one or more user devices 150 (e.g., user device 150A, user device 150B, . . . , user device 150N). According to some embodiments, the operation software design system 110 includes an operation software builder 120, a user interface 125 and one or more memories 130. Although the above has been shown using a selected group of components in the operation software environment 100, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present disclosure.

According to some embodiments, the operation software design system 110 and/or the operation software builder 120 is configured to receive inputs and present options or configurations via the user interface 125 to one or more users. In certain embodiments, the operation software design system 110 and/or the operation software builder 120 is configured to access one or more action types and one or more object types. In certain embodiments, the action type represents a type of action to be applied to one or more objects of the one or more object types, such as create, modify, and/or delete the one or more objects, also referred to as target objects. In some embodiments, each object is of an object type including one or more object properties. In certain embodiments, the operation software design system 110 and/or the operation software builder 120 is configured to link a first object type to a second object type for an action type. In some embodiments, the operation software design system 110 and/or the operation software builder 120 is configured to link an action of the action type to one or more object types. In certain embodiments, an action being taken is configured to modify a property of an object or create a new property value for an object.

According to certain embodiments, the operation software design system 110 and/or the operation software builder 120 is configured to include a user interface design to configure how one or more object types and associated one or more object properties, one or more action types and one or more action parameters can be presented on a user interface rendered by an operation software 140. In response to inputs received at the user interface 125, the operation software design system 110 and/or the operation software builder 120 is configured to generation one or more action log objects. In some embodiments, action log objects are one or more types of objects.

According to certain embodiments, the operation software 140 is configured to validate one or more actions of an action type. In certain embodiments, the operation software 140 includes one or more object types, one or more action types, and a set of validation rules. In some embodiments, the operation software 140A includes a first set of validation rules 145A associated with an action type and runs on a user device 150A used by a first operator (e.g., a pilot) associated with one or more first operator characteristics. In certain embodiments, an operator characteristic includes an operator group, an operator group identifier (ID), an operator ID, an access level, a role, a location, an organization, and/or the like. In some embodiments, operator characteristics can be hierarchical. In some embodiments, the operation software 140B includes a second set of validation rules 145B associated with the action type and runs on a user device 150B used by a second operator (e.g., a flight controller) with one or more second operator characteristics. In certain embodiments, the first set of validation rules 145A are different from the second set of validation rules 145B.

According to some embodiments, a set of validation rules 145 include at least one a global validation rule associated with the action type, and at least one local validation rule representing or associated with a specific condition for the action type. In certain embodiments, a global validation rule remains the same across the operation software 140A, 140B, . . . , 140N. In some examples, the operation software 140A is different from the operation software 140N in software code. For example, the operation software 140A is a software application (e.g., a software module) used by a pilot and the operation software 140B is a software application used by an airport controller, and both the operation software 140A and the operation software 140B implement a "delay-flight" action, while the operation software 140A includes other pilot actions such as "push-off-flight" and the operation software 140B includes other controller actions such as "set runway sequence". In certain examples, the operation software 140A and the operation software 140B have a same software module incorporating the action type. In some examples, the operation software 140A and the operation software 140B have a respective software module, different from each other, incorporating the action type.

According to certain embodiments, a global validation rule remains the same for various operators or various operator characteristics. In some examples, a global validation rule is used by the operation software 140A associated with the first operator and/or the one or more first operator characteristics, and the global validation rule is used by the operation software 140B associated with the second operator and/or the one or more second operator characteristics. For example, the global validation rule for a "plant-a-tree" action type is that a tree can be planted only by a qualified planter. In certain embodiments, the global validation rule is associated with a rule parameter (e.g., a planter), wherein the rule parameter is corresponding to at least one selected from a group consisting of the one or more object properties of the target object type, the one or more action parameters of the action type, and one or more object properties of a second object type associated with the action type, where the second object type is different from the target object type. In some embodiments, the global validation rule is associated with one or more operator characteristics. For example, the global validation rule is a rule on an operator characteristic within a certain range (e.g., auditor or administrator, restricted, all access levels, access levels higher than a predetermined level, etc.).

According to some embodiments, a local validation rule includes a condition specific to a rule parameter and/or an operator characteristic. In certain embodiments, the local validation rule includes a condition specific to a rule parameter (e.g., within a predetermined range). In some embodiments, the local validation rule includes a condition specific to an operator characteristic (e.g., a role). For example, the local validation rule for a "plant-a-tree" action type is that a tree can be planted only at a first set of areas (e.g., with certain zip codes) by a first group of planters. As an example, the local validation rule for a "plant-a-tree" action type is that a tree can be planted only at a second set of areas (e.g., with certain zip codes) by a second group of planters.

In some embodiments, the local validation rule is applicable to a subset of the operation software 140. In certain embodiments, the local validation rule is not applicable to an operation software 140 (e.g., operation software 140N). In some embodiments, the global validation rule is applicable to an instance of an action of the action type (e.g., plant a tree by a second group of planters), where the local validation rule is not applicable to the instance of action of the action type. In certain embodiments, an instance of an action refers to an action instantiated by an operation software.

According to certain embodiments, the set of validation rules 145 are configurable via the user interface 125. In some embodiments, the set of validation rules 145 include at least one rule generated based at least in part upon inputs received via the user interface 125. In certain embodiments, the set of validation rules 145 include a rule generated based at least in part upon inputs received via the user interface in response to one or more configurations associated with a rule parameter.

According to some embodiments, using the user interface 125, the system includes a configuration of action log objects. In certain embodiments, the operation software design system populates the configuration interface with one or more action types and associated one or more action parameters, one or more object types and associated one or more object properties, one or more objects and one or more additional properties associated with the designed action. In some embodiments, the configuration of action log objects allows a user to select the data to be logged associated with the designed action. In certain embodiments, one or more action log objects include or link to one or more objects. In some embodiments, one or more action log objects include or link to one or more actions. In certain embodiments, one or more action log objects include one or more object properties. In some embodiments, one or more action log objects include to one or more action parameters.

According to certain embodiments, the operation software design system 110 and/or the operation software builder 120 is configured to design the action log objects depending on a role of a user using the user device 150. In some embodiments, the operation software design system 110 and/or the operation software builder 120 is configured to deploy or allow installations of application software 140 (e.g., application software 140A, application software 140B, . . . , application software 140N) onto respective user devices 150 (e.g., user device 150A, user device 150B, . . . , user device 150N).

According to some embodiments, the operation software 140 (e.g., an application software) is configured to generate the one or more action logs 147, each action log 147 of the one or more action logs 147 includes or links to one or more objects of the one or more object types, for example, to provide log content. In some embodiments, the operation software 140 is configured to log one or more actions of the one or more action types to generate action logs 147. In certain embodiments, an object is associated with is a history of action logs (e.g., decisions made on the object). In some embodiments, an action log 147 generated based on an action log object includes one or more selected object properties of a target object type and one or more selected action parameters of an action type. In certain embodiments, the action log object 240 is configurable via the user interface 125 in FIG. 1. In certain embodiments, the operation software 140 is configured to load a target object of the target object type, receive an action of an action type conducted on the target object. In some embodiments, the operation software 140 is configured to record the action context (e.g., the workflow context) associated with the action type in the action log 147.

According to some embodiments, one or more action contexts are associated with an action type. In some embodiments, two or more action contexts are associated with an action type. In certain embodiments, two or more action contexts are associated with an action type depending on an object type of the object associated with the action of the action type. According to certain embodiments, an action context includes a decision context associated with the decision (e.g., action time, related object) and a workflow context that is hidden from the user. In some embodiments, the action context includes one or more comments.

According to certain embodiments, the operation software 140 includes a first action context associated with the action type, a first object type and/or a first object of the first object type. In certain embodiments, the operation software 140 includes a second action context associated with the action type, a second object type and/or a second object of the second object type. In some embodiments, the operation software 140 includes a first action log object associated with the action type, where the first action log object includes the first action context. In some embodiments, the operation software 140 includes a second action log object associated with the action type, where the second action log object includes the second action context.

In certain embodiments, the action type is associated with editing an object (e.g., a target object) of the object type. In some embodiments, editing an object of an object type includes creating the target object of the target object type, modifies one or more object properties of the target object of the target object type, and deleting the target object of the target object type. In some embodiments, the target object type is associated with a second object type in the context of the action type. For example, a flight object type is associated with an airport object type in a first context of delay-flight action type. In certain embodiments, the first action log object includes one or more properties of the target object type, one or more properties of the second object type, and one or more action parameters of action type. In some embodiments, a first action log (e.g., a log of the flight delay 1) generated from the first action log object is linked to a target object (e.g., flight 123) of the target object type and a second object (e.g., airport A) of the second object type. In certain embodiments, a link to an object is an object identifier (ID) identifying the object.

In some embodiments, the second object is associated with the second object type and a third object type in a second context of the action type. For example, a flight object type is associated with an airport object type and a weather object type in the context of delay-flight action type. In certain embodiments, the second action log object includes one or more properties of the target object type, one or more properties of the second object type, one or more properties of the third object type, and one or more action parameters of action type. In some embodiments, a second action log (e.g., a log of the flight delay 2) generated from the second action log object is linked to a target object (e.g., flight 123) of the target object type, a second object (e.g., airport A) of the second object type, and a third object (e.g., weather of the airport A at XX time) of the third object type.

According to some embodiments, the action context includes a first state of the target object before the action is taken. In certain examples, the action context includes metadata associated with the action. In some embodiments, the action type includes or is associated with one or more action rules (e.g., permission, permissible range, etc.). In some examples, the action context includes at least one action rule of the one or more action rules.

According to certain embodiments, the operation software 140 is configured to send the action logs 147 to a data repository (e.g., a local data repository on a user device 140 in FIG. 1, the data repository 135 in FIG. 1). In some embodiments, the action logs 147 are configured to be uploaded to a data repository (e.g., the data repository 135 in FIG. 1), for example, via a software service, a data synchronization process.

According to some embodiments, the action log 147 can be analyzed via different software and/or via different users, where each software or user is associated with a respective access level and/or access role. In some embodiments, the action log 147 can be retrieved with some data rows and/or data fields hidden depending on the access level and/or data roles. In certain embodiments, the access level includes a high access level, a middle access level, and a low access level, where the action log 147 includes all data fields when accessed at the high access level, the action log 147 includes a first subset of data fields when accessed at the middle access level, and the action log 147 includes a second subset of data fields when accessed at the low access level, where the first subset of data fields is larger than the second subset of data fields. In certain examples, at least one data field (e.g., location) is included in the first subset of data fields and not in the second subset of data fields. In some embodiments, the access role includes a plurality of roles (e.g., auditor role, analyst role, operator rule).

In certain embodiments, the action log 147 includes a first subset of data rows when accessed at a first role (e.g., analyst role) and the action log 147 includes a second subset of data rows when accessed at a second role (e.g., auditor role), where the first subset of data rows is larger than the second subset of data rows. In some examples, at least one data row is included in the first subset of data rows and not in the second subset of data rows. In certain embodiments, the action log 147 includes a first subset of data when accessed at a first role (e.g., analyst role) and the action log 147 includes a second subset of data when accessed at a second role (e.g., auditor role). In some examples, the first subset of data includes more data fields than the data fields in the second subset of data and the first subset of data and the first subset of data includes more data rows than the data rows in the second subset of data. In certain examples, the first subset of data includes less data fields than the data fields in the second subset of data and the first subset of data and the first subset of data includes more data rows than the data rows in the second subset of data.

In some embodiments, a reason of the action can be inferred based on analyzing the action log 147. In certain embodiments, a reason of the action can come from objects and object properties (e.g., variables) not modified by the action. For example, a reason of the delay-flight action can be the weather associated with the flight. As an example, a reason of the delay-flight action can be a property (e.g., a condition, a variable) of the airport associated with the flight. In some embodiments, the one or more action log objects are instantiated at a first time and the linked one or more objects are changed at a second time, where the one or more action log objects include the links to the one or more objects. In some embodiments, the link to an object in the action log object maintains the link to the object (e.g., object identifier (ID), record ID, etc.) even if the object data structure has changed. In certain embodiments, the one or more action log objects are snapshots associated with a state (e.g., one or more object properties data) of the linked one or more objects when the action is taken.

According to some embodiments, the one or more action log objects are of action log object types. In certain embodiments, action log object types map one to one with action types. In certain embodiments, action log object types map one to multiple, multiple to one, and/or multiple to multiple with action types. In certain embodiments, submitting an action generates a single new object of the corresponding action log object type. In some embodiments, this newly created object is automatically linked to all objects edited by the submitted action.

In some embodiments, the ontology data repository 135 and/or the application repository, on the operation software design system 110 and/or a user device 150, can include object data, action data, one or more action logs, one or more user data, and/or the like. The ontology data repository 135 and/or the application repository may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the operation software environment 100 can execute software or firmware stored in non-transitory computer-readable medium to implement various processing steps. Various components and processors of the operation software environment 100 can be implemented by one or more computing devices, including but not limited to, circuits, a computer, a cloud-based processing unit, a processor, a processing unit, a microprocessor, a mobile computing device, and/or a tablet computer. In some cases, various components of the operation software environment 100 (e.g., the operation software design system 110, the operation software builder 120, the user devices 150) can be implemented on a shared computing device. Alternatively, a component of the operation software environment 100 can be implemented on multiple computing devices. In some implementations, various modules and components of the operation software environment 100 can be implemented as software, hardware, firmware, or a combination thereof. In some cases, various components of the operation software environment 100 can be implemented in software or firmware executed by a computing device.

Various components of the operation software environment 100 can communicate via or be coupled to via a communication interface, for example, a wired or wireless interface. The communication interface includes, but not limited to, any wired or wireless short-range and long-range communication interfaces. The short-range communication interfaces may be, for example, local area network (LAN) interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 2:
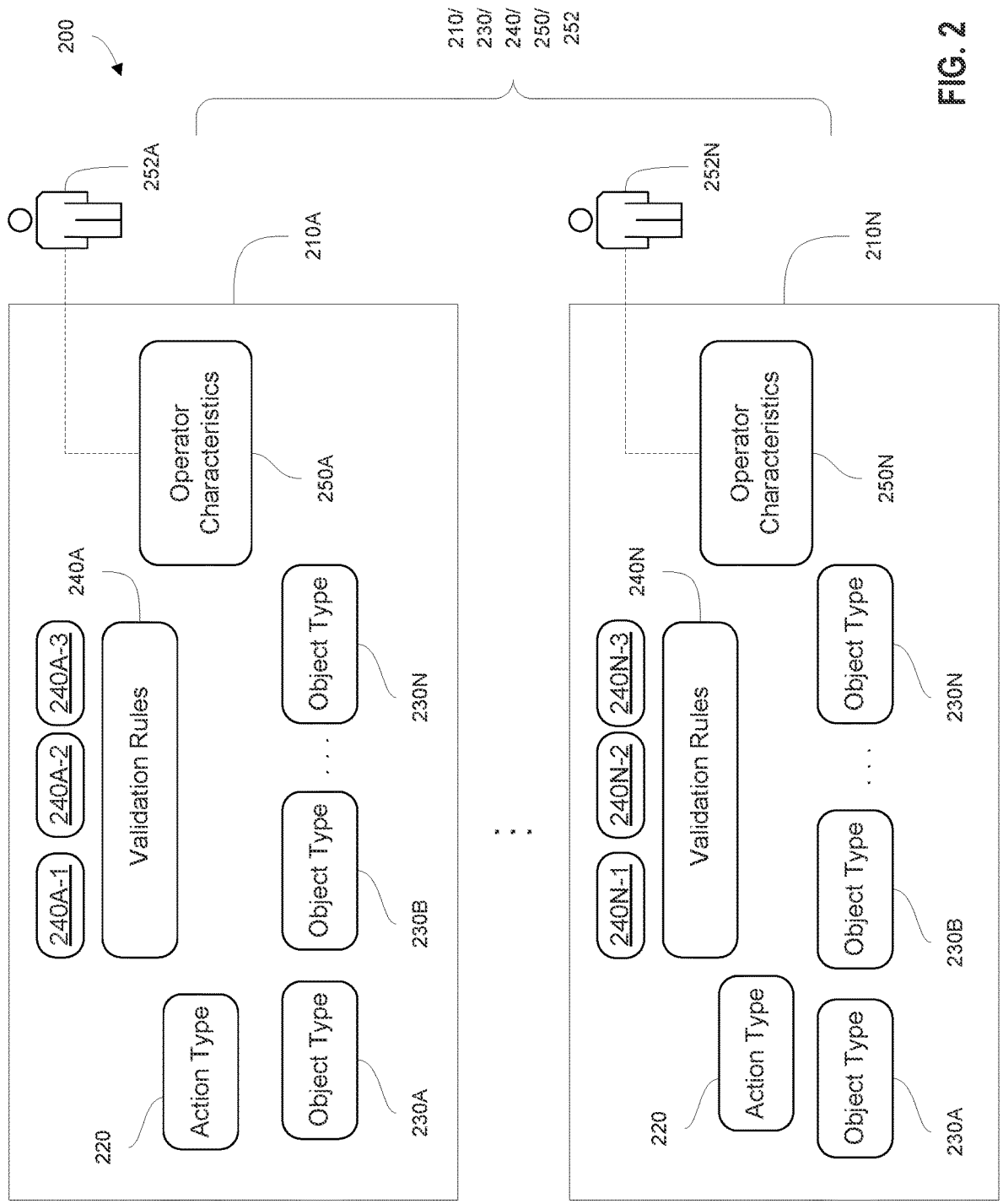
FIG. 2 is an illustrative example of an operation software environment with action validations, according to certain embodiments of the present disclosure.

FIG. 2 is an illustrative example of an operation software environment 200 with action validation, according to certain embodiments of the present disclosure. In some embodiments, the operation software environment includes an operation software 210 (e.g., operation software 210A, . . . , operation software 210N), implemented on a user device (e.g., user device 150 in FIG. 1) used by an operator 250 with one or more operator characteristics 252. In certain embodiments, an operator characteristic includes an operator group, an operator group identifier (ID), an operator ID, an access level, a role, a location, an organization, and/or the like.

According to certain embodiments, the operation software 210 is configured to validate one or more actions of an action type 220. In certain embodiments, the operation software 210 includes one or more object types 230 (e.g., object type 230A, object type 230B, . . . , object type 230N), one or more action types 220, and a set of validation rules 240. In some embodiments, the operation software 210A includes a set of validation rules 240A associated with the action type 220 and is used by an operator 252A (e.g., a pilot) with one or more operator characteristics 250A. In certain embodiments, the operation software 210N includes a set of validation rules 240N associated with the action type 220 and is used by an operator 252N (e.g., a flight controller) with one or more operator characteristics 250N. In some embodiments, the set of validation rules 240A are different from the set of validation rules 240N. In certain examples, the set of validation rules 240A includes a first validation rule 240A-1, a second validation rule 240A-2, and a third validation rule 240A-3. In certain examples, the set of validation rules 240N includes a first validation rule 240N-1, a second validation rule 240N-2, and a third validation rule 240N-3.

According to some embodiments, a set of validation rules 240 include at least one a global validation rule associated with the action type 220, and at least one local validation rule representing or associated with a specific condition for the action type 220. In certain embodiments, a global validation rule remains the same across the operation software 210A, . . . , 210N. In some examples, the operation software 210A is different from the operation software 210N in software code. For example, the operation software 210A is a software application (e.g., a software module) used by a pilot and the operation software 210N is a software application used by an airport controller, and both the operation software 210A and the operation software 210N implement a "delay-flight" action, while the operation software 210A includes other pilot actions such as "push-off-flight" and the operation software 210N includes other controller actions such as "set runway sequence". In certain examples, the operation software 210A and the operation software 210N have a same software module incorporating the action type 220. In some examples, the operation software 210A and the operation software 210N have a respective software module, different from each other, incorporating the action type 220.

According to certain embodiments, a global validation rule remains the same for various operators 250 or various operator characteristics 252. In some examples, a global validation rule is used by the operation software 210A associated with the operator 252A and/or the one or more operator characteristics 250A and the operation software 210N associated with the operator 252N and/or the one or more operator characteristics 250N. For example, the global validation rule for a "plant-a-tree" action type is that a tree can be planted only by a qualified planter. In certain embodiments, the global validation rule is associated with a rule parameter (e.g., a planter), wherein the rule parameter is corresponding to at least one selected from a group consisting of the one or more object properties of the target object type, the one or more action parameters of the action type, and one or more object properties of a second object type associated with the action type, where the second object type is different from the target object type. In some embodiments, the global validation rule is associated with one or more operator characteristics 252. For example, the global validation rule is a rule on an operator characteristic within a certain range (e.g., auditor or administrator, restricted, all access levels, access levels higher than a predetermined level, etc.).

According to some embodiments, a local validation rule includes a condition specific to a rule parameter and/or an operator characteristic. In certain embodiments, the local validation rule includes a condition specific to a rule parameter (e.g., within a predetermined range). In some embodiments, the local validation rule includes a condition specific to an operator characteristic (e.g., a role). For example, the local validation rule for a "plant-a-tree" action type is that a tree can be planted only at a first set of areas (e.g., with certain zip codes) by a first group of planters. As an example, the local validation rule for a "plant-a-tree" action type is that a tree can be planted only at a second set of areas (e.g., with certain zip codes) by a second group of planters.

According to certain embodiments, the set of validation rules 240 are configurable via a user interface (e.g., the user interface 125 in FIG. 1). In some embodiments, the set of validation rules 240 include at least one rule generated based at least in part upon inputs received via the user interface. In certain embodiments, the set of validation rules 240 include a rule generated based at least in part upon inputs received via the user interface in response to one or more configurations associated with a rule parameter.

FIG. 3 is a simplified diagram showing a method 300 for building a software application with action validations according to certain embodiments of the present disclosure. This diagram is merely an example. One of ordinary skill in the art would recognize many variations, alternatives, and modifications. The method 300 for building a software application with action validations includes processes 310, 315, 320, 330, 335, 340, and 345. Although the above has been shown using a selected group of processes for the method 300 for building a software application with action validations, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present disclosure.

In some embodiments, some or all processes (e.g., steps) of the method 300 are performed by a system (e.g., the computing system 600). In certain examples, some or all processes (e.g., steps) of the method 300 are performed by a computer and/or a processor directed by a code. For example, a computer includes a server computer and/or a client computer (e.g., a personal computer). In some examples, some or all processes (e.g., steps) of the method 300 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at the process 310, the operation software design system (e.g., the operation software design system 110 in FIG. 1) is configured to access a target object type, where the target object type includes one or more object properties. In certain embodiments, at the process 315, the system is configured to access an action type, the action type comprising one or more action parameters and associated with one or more action rules, the action type associating with editing a target object of the target object type. In some embodiments, at the process 320, the operation software design system is configured to identify a second object type associated with the target object type for the action type. In certain embodiments, at the process 325, the operation software design system is configured to access one or more operator characteristics.

According to certain embodiments, at the process 330, the operation software design system is configured to present one or more configurations associated with a rule parameter. In some embodiments, the rule parameter is corresponding to at least one selected from a group consisting of the one or more object properties of the target object type, the one or more action parameters of the action type, one or more object properties of the second object type associated with the action type, and the one or more operator characteristics. In certain embodiments, the one or more configurations include a value range of the rule parameter. In some embodiments, the one or more configurations include a permissible value of the rule parameter. In certain embodiments, the one or more configurations include a message associated with the validation rule. For example, the one or more configurations include a negative response message if an action is invalidated by a validation rule including the rule parameter. As an example, the one or more configurations include a positive response message if an action is validated by a validation rule including the rule parameter.

According to some embodiments, at the process 335, the operation software design system is configured to receive an input to the one or more configurations. In certain embodiments, at the process 340, the operation software design system is configured to generate a set of validation rules associated with the action type, where the set of validation rules includes a global validation rule and/or a local validation rule.

According to certain embodiments, the global validation rule remains the same for various operators or various operator characteristics. In some examples, a global validation rule is used by a first operation software associated with the first operator and/or the one or more first operator characteristics and a second operation software associated with the second operator and/or the one or more second operator characteristics. For example, the global validation rule for a "plant-a-tree" action type is that a tree can be planted only by qualified planter. In certain embodiments, the global validation rule is associated with a rule parameter (e.g., a planter), wherein the rule parameter is corresponding to at least one selected from a group consisting of the one or more object properties of the target object type, the one or more action parameters of the action type, and one or more object properties of a second object type associated with the action type, where the second object type is different from the target object type. In some embodiments, the global validation rule is associated with one or more operator characteristics. For example, the global validation rule is a rule on an operator characteristic within a certain range (e.g., auditor or administrator, restricted, all access levels, access levels higher than a predetermined level, etc.).

According to some embodiments, a local validation rule includes a condition specific to a rule parameter and/or an operator characteristic. In certain embodiments, the local validation rule includes a condition specific to a rule parameter (e.g., within a predetermined range). In some embodiments, the local validation rule includes a condition specific to an operator characteristic (e.g., a role). For example, the local validation rule for a "delay-flight" action type is that a pilot can delay a flight A by 5 minutes. As an example, the local validation rule for the "delay-flight" action type is that a pilot can delay a flight B by 15 minutes. For example, the local validation rule for the "delay-flight action type is that an airport controller can delay a flight A by 10 minutes. In some embodiments, the global validation rule is applicable to an instance of an action of the action type (e.g., delay-flight), where the local validation rule is not applicable to the instance of the action of the action type. In certain embodiments, the local validation rule is applicable to a subset of operation software including actions of the action type. In some embodiments, the local validation rule is not applicable to a second subset of operation software including actions of the action type. For example, a local validation rule of "delay-flight" action type is applicable to the application software used by or to be used by pilots. As an example, a local validation rule of "delay-flight" action type is not applicable to the application software used by or to be used by administrators for airports.

According to some embodiments, at the process 345, the operation software design system is configured to build a software application, wherein the software application includes the target object type, the action type, and the set of validation rules.

Figure 4A:
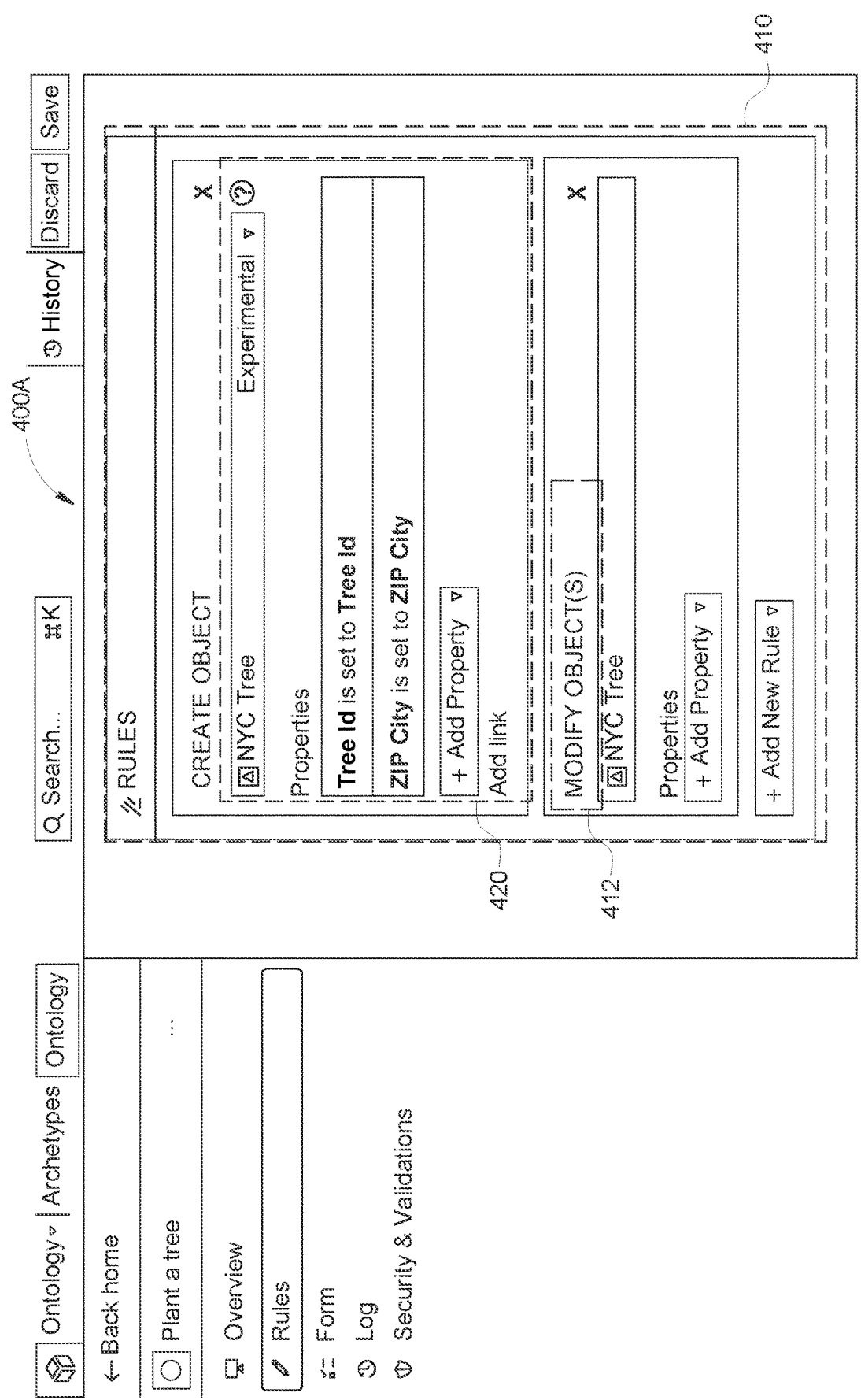
Figure 4B:
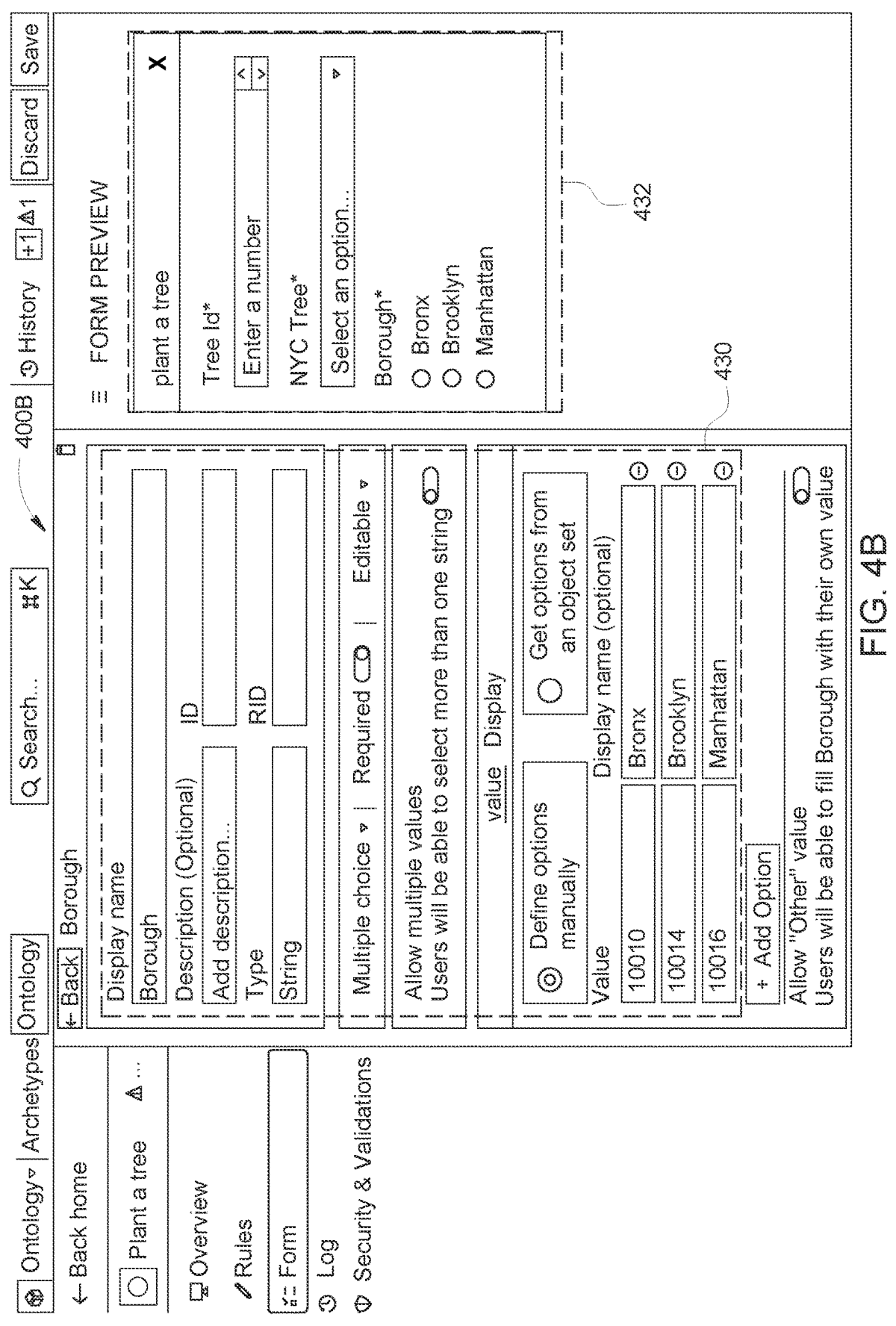
Figure 4C:
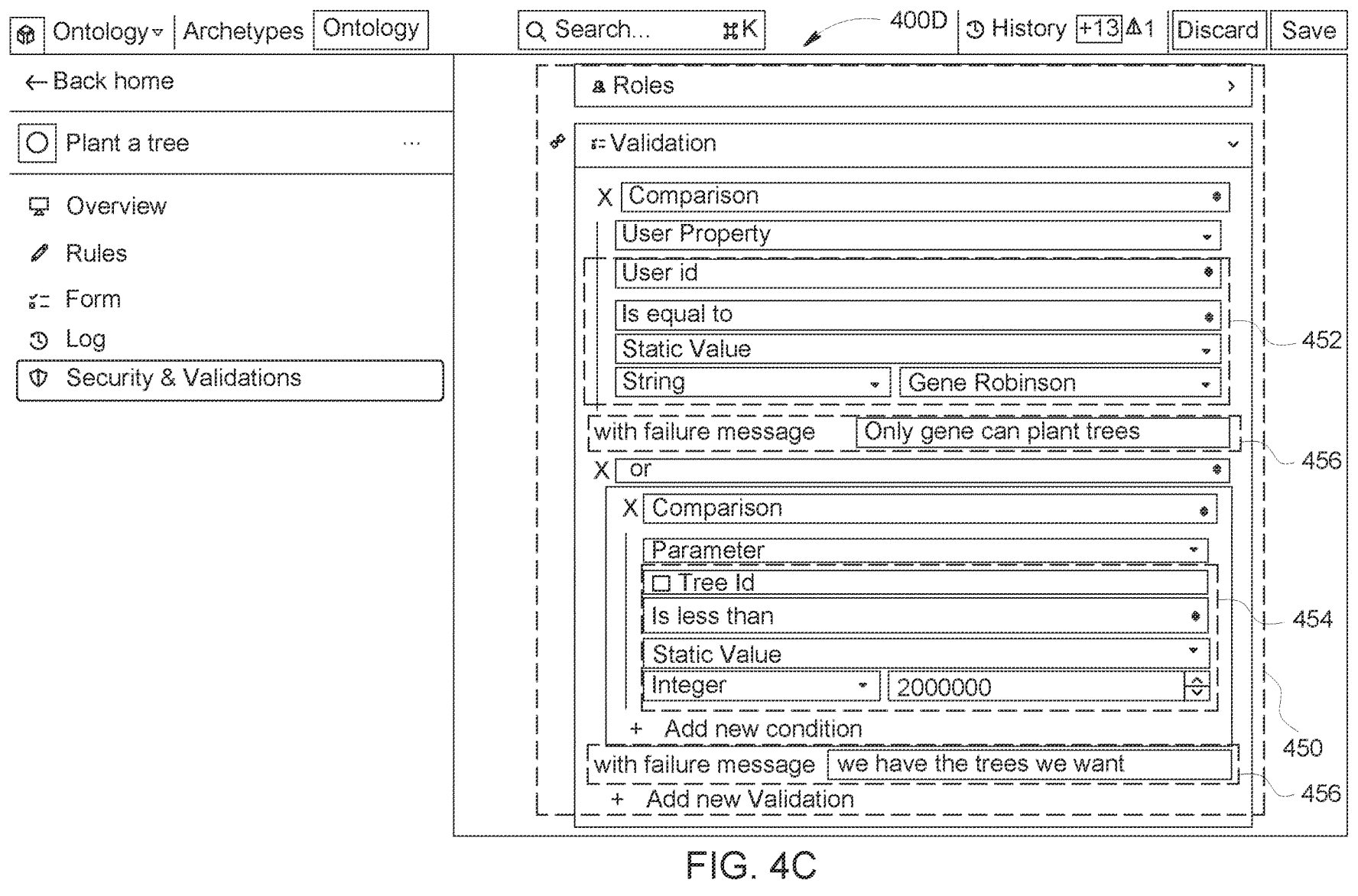

FIGS. 4A-4C are example user interfaces of an operation software design system, in accordance with certain embodiments of the present disclosure. According to some embodiments, using a user interface 400A illustrated in FIG. 4A, the operation software design system (e.g., operation software design system 110 in FIG. 1) is configured to create a new action type 410. In certain embodiments, the action type 410 includes a type of action 412 to be applied to one or more objects 420, such as create, modify, and/or delete an object. In one example, the new action type is a plant-tree action. In certain embodiments, the created action type can be used to log information on the action of the created action type, including action times. For example, the plant-tree action type is used to log the different times that trees are planted, for example, during an event. In some embodiments, the action type name is defined (e.g., "plant a tree").

According to certain embodiments, one or more validation rules of the action type can be generated or selected. In some embodiments, the one or more validation rules are associated with an operator characteristic, for example, a user, a user identifier (ID), a user role, a user group, a user access level, and/or the like. In certain embodiments, the one or more validation rules are associated with the action type and one or more associated objects (e.g., tree object) and/or object properties (e.g., time). In some embodiments, the action is to create an object (e.g., tree object, New York City (NYC) Tree object). In certain embodiments, the action is to modify an object, for example, editing the tree object.

According to some embodiments, as illustrated in FIG. 4A, the system is configured to add one or more properties to the object. For example, a tree object includes a tree identifier (ID) and a Zip City (e.g., where a tree is planted). In certain embodiments, the system can link one object to another object. As an example, the system is configured to link a tree object to a city object. In certain embodiments, an action being taken is configured to modify a property of an object. For example, a "plant a tree" action is configured to increment a tree count by one in a city object. In some embodiments, the action type is associated with one or more rules for one or more validations. For example, a "plant a tree" action includes a validation rule of a range of zip codes. As an example, a "plant a tree" action includes a validation rule of a geographic range.

According to certain embodiments, using the user interface 400B illustrated in FIG. 4B, the system includes a user interface design 430 to configure how one or more objects, one or more actions, and one or more properties (e.g., object properties, action parameters) can be presented in a user interface. In some embodiments, a user interface preview 432 can be included in the operation software design system.

According to some embodiments, using the user interface 400C illustrated in FIG. 4C, the system includes a configuration of validation rules 450. In certain embodiments, the operation software design system populates the configuration interface with one or more objects and/or one or more object properties associated with the designed action. In some embodiments, the configuration of validation rules 450 allows a user to select a value associated with an object property and the designed action as illustrated in 452. In certain embodiments, the configuration of validation rules 450 allows a user to set a threshold or a range of values associated with an object property the designed action as illustrated in 454. In some embodiments, the configuration of valuation rules 450 allows a user to specify a validation failure message 456. In certain embodiments, the one or more validation rules can be logged using an action log object.

According to certain embodiments, using the operation design software, a user can define one or more rules including one or more validation rules. For example, only a specific person (e.g., "Gene Robinson") can plant a tree, and a validation rule on a user ID of a user object associated with the "plant-a-tree" action can be set to User ID being equal to static value of string of "Gene Robinson". As an example, only tree ID in a specific range can be planted, and a validation rule on a tree ID of a tree object associated with the "plant-a-tree" action can be set to Tree Id being less than the static value of integer of 2000000. For example, a pilot can delay a flight by no more than five (5) minutes, and the validation rule on a flight time of a flight object associated with the "delay-flight" action and a pilot object can be set to the flight time being increased by no more than five (5) minutes. As an example, under a policy is that pilot can delay up to 5 minutes and the controller can delay up to 10 minutes, the set of validation rules for "delay-flight" action can further include a validation rule on a flight time of a flight object associated with the "delay-flight" action and a flight-controller object can be set to the flight time being increased by no more than ten (10) minutes. According to some embodiments, the system for action validations includes parameter specific validations, such that a single parameter can be evaluated or a plurality of parameters can be evaluated.

According to some embodiments, the example user interface includes a form showing different parameters, for example, parameters that users can input or modify. For example, one of the parameters will be the time period for delay-flight object, which takes a number. In certain embodiments, a validation rule is to set up a condition for a parameter. In some embodiments, a validation rule is on one or more independent conditions that apply to the designed action, for example, a condition being true or false. In some embodiments, a set of validation rules includes one or more global validation rules applying to one or more overall conditions for the designed action and one or more local validation rules applying to one or more specific parameters. In certain embodiments, at least one of the one or more specific validation rules is associated with one or more operator characteristics (e.g., role, age, etc.). In some embodiments, the one or more validation rules and/or the action type define which object to impact. For example, the object impacted is the flight object. In certain embodiments, the one or more validation rules and/or the action type define which object properties, also referred to as object parameters, to impact. As an example, the object parameter impacted is the flight time.

According to certain embodiments, the one or more validation rules define or are linked to a respective action type. In some embodiments, a user must have proper permission to design (e.g., create, modify, delete) one or more rules on one or more actions. For example, the action is "plant a tree" that is associated to a city tree object and a zip city. As an example, a validation rule can be designed to select certain boroughs for planting the trees. For example, only one of the three boroughs can have a tree planted, so the validation rule for the "plant-a-tree" action includes a selection from the three boroughs. In certain embodiments, the specific parameter is a parameter of an object not directly impacted by the action, but associated (e.g., directly or indirectly) with the object being impacted. As an example, for the "plant a tree" action, the city tree object is directly impacted (e.g., tree count incremented by one (1) for each tree planted satisfying the validation rule) and the borough is a parameter of a city object associated with the city tree object. In certain embodiments, a validation rule is represented by a rule on a rule parameter, and the rule parameter can be mapped to and/or translated into an object property. For example, a "borough" rule parameter is translated into a "zip code" object property of the city object.

According to some embodiments, at least one of the one or more validation rules is associated with an operator characteristic and a parameter condition. For example, a validation rule is on a specific planter or a specific group of planters being allowed to plant trees at one of the three boroughs. In certain embodiments, a validation rule is associated with a parameter condition, but is not associated with an operator characteristic. In some embodiments, a validation rule is associated with an operator characteristic, but is not associated with a specific parameter.

According to certain embodiments, a validation rule may use an operator characteristic in a hierarchy of operators or other actors. In some embodiments, a validation rule applies at the action level (e.g., executed by one or more software application), for example, a global validation. In certain embodiments, the validation rule may include adding a new parameter to track the number of trees being planted. For example, for an action of planting two (2) million trees in New York City, a global validation is to set the tree ID no higher than 2,000,000.

Figure 5:
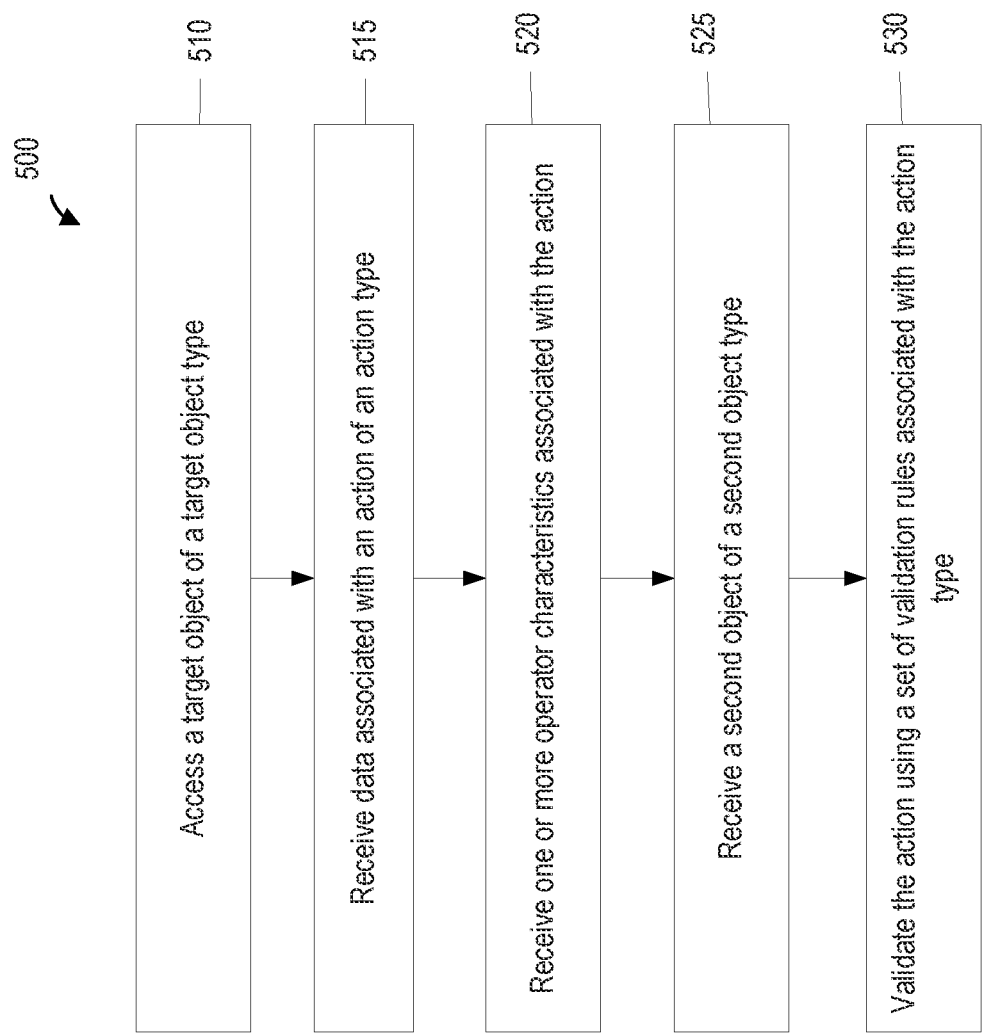
FIG. 5 is a simplified diagram showing a method for software action validations according to certain embodiments of the present disclosure.

FIG. 5 is a simplified diagram showing a method 500 for software action validations according to certain embodiments of the present disclosure. This diagram is merely an example. One of ordinary skill in the art would recognize many variations, alternatives, and modifications. The method 500 for software action validations includes processes 510, 515, 520, 525, and 530. Although the above has been shown using a selected group of processes for the method 500 for software action validations, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present disclosure. Various embodiments described in the present disclosure can be applied to and incorporated into the method 500.

In some embodiments, some or all processes (e.g., steps) of the method 500 are performed by a system (e.g., the computing system 600). In certain examples, some or all processes (e.g., steps) of the method 500 are performed by a computer and/or a processor directed by a code. For example, a computer includes a server computer and/or a client computer (e.g., a personal computer). In some examples, some or all processes (e.g., steps) of the method 500 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at process 510, the system (e.g., the user device 150 implementing the operation software 140 in FIG. 1) is configured to access a target object of a target object type, where the target object type includes one or more object properties. In some embodiments, the target object is an instance of object (e.g., a tree object, a flight object) of the target object type. In certain embodiments, at process 515, the system is configured to receive data associated with an action of an action type, where the action type includes one or more action parameters and is associated with a set of validation rules. In some embodiments, the action type is associated with editing an object of the target object type (e.g., plant a tree).

According to certain embodiments, at process 520, the system is configured to receive one or more operator characteristics associated with the action. In certain embodiments, at process 525, the system is configured to receive a second object of a second object type. In some embodiments, the second object type (e.g., airport) is associated with the target object type (e.g., flight) for the action type.

According to some embodiments, at process 530, the system is configured to validate the action using a set of validation rules associated with the action type. In some embodiments, the system includes a first set of validation rules associated with the action type applicable to a first operator (e.g., a pilot) associated with one or more first operator characteristics and a second set of validation rules associated with the action type applicable to a second operator (e.g., a flight controller) associated with one or more second operator characteristics. In certain embodiments, an operator characteristic includes an operator group, an operator group identifier (ID), an operator ID, an access level, a role, a location, an organization, and/or the like. In some embodiments, operator characteristics can be hierarchical. In certain embodiments, the operator characteristics are associated with an operator hierarchy, where operator characteristics of an operator of a first level in the operator hierarchy are included for operator characteristics of an operation of a second level in the operator hierarchy, for example, the second level is a parent level of the first level. In certain embodiments, the first set of validation rules are different from the second set of validation rules.

According to some embodiments, a set of validation rules include at least one global validation rule associated with the action type, and at least one local validation rule representing or associated with a specific condition for the action type. According to certain embodiments, a global validation rule remains the same for various operators or various operator characteristics. For example, the global validation rule for a "plant-a-tree" action type is that a tree can be planted only by a qualified planter. In certain embodiments, the global validation rule is associated with a rule parameter (e.g., a planter), wherein the rule parameter is corresponding to at least one selected from a group consisting of the one or more object properties of the target object type, the one or more action parameters of the action type, and one or more object properties of a second object type associated with the action type, where the second object type is different from the target object type. In some embodiments, the global validation rule is associated with one or more operator characteristics. For example, the global validation rule is a rule on an operator characteristic within a certain range (e.g., auditor or administrator, restricted, all access levels, access levels higher than a predetermined level, etc.).

According to some embodiments, a local validation rule includes a condition specific to a rule parameter and/or an operator characteristic. In certain embodiments, the local validation rule includes a condition specific to a rule parameter (e.g., within a predetermined range). In some embodiments, the local validation rule includes a condition specific to an operator characteristic (e.g., a role). For example, the local validation rule for a "plant-a-tree" action type is that a tree can be planted only at a first set of areas (e.g., with certain zip codes) by a first group of planters. As an example, the local validation rule for a "plant-a-tree" action type is that a tree can be planted only at a second set of areas (e.g., with certain zip codes) by a second group of planters.

Figure 6:
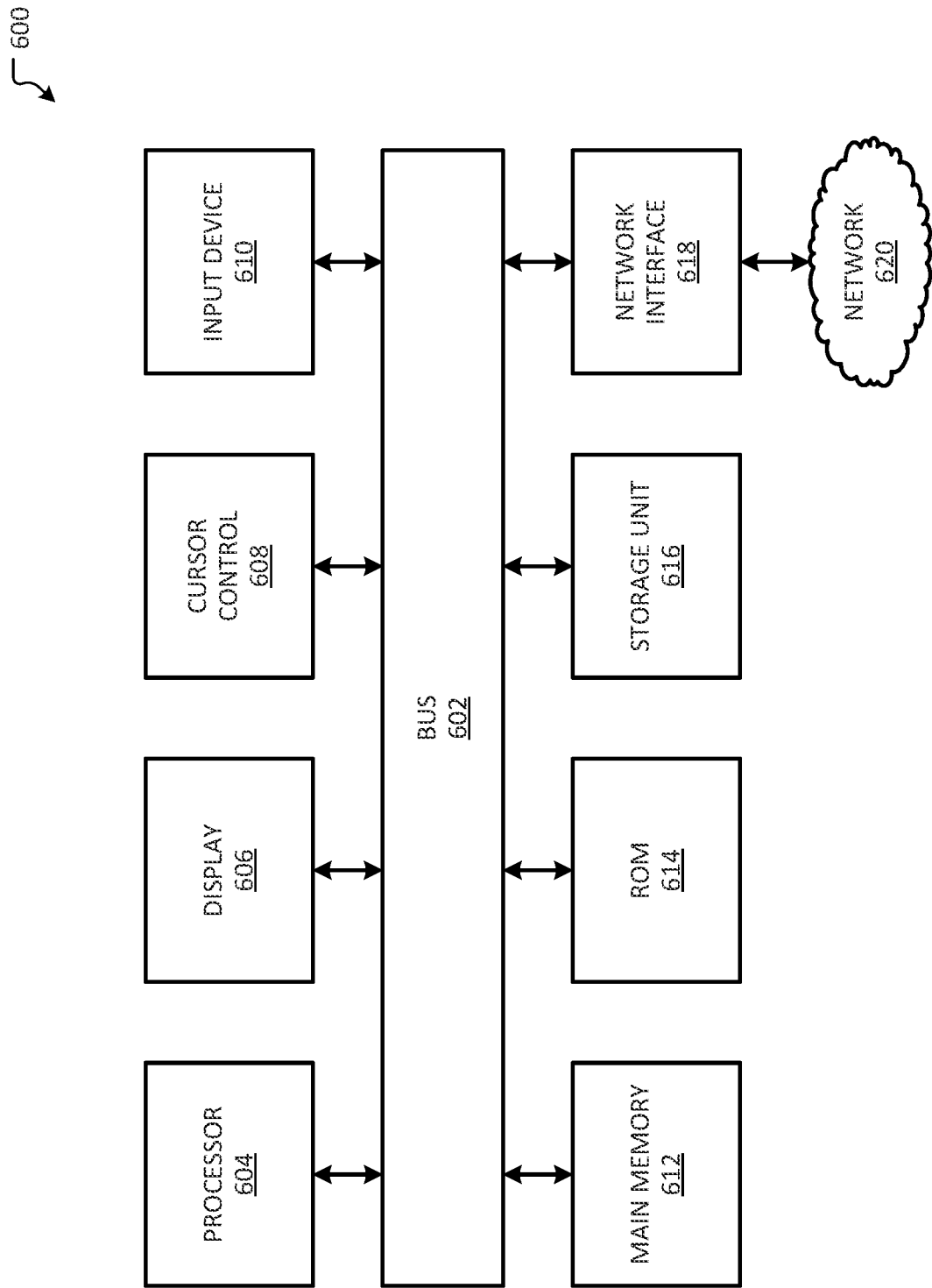
FIG. 6 is a simplified diagram showing a computing system for implementing a system for building a software application with action validations in accordance with at least one example set forth in the disclosure.

FIG. 6 is a simplified diagram showing a computing system for implementing a system 600 for building a software application with action validations in accordance with at least one example set forth in the disclosure. This diagram is merely an example, which should not unduly limit the scope of the claims. One of ordinary skill in the art would recognize many variations, alternatives, and modifications.

The computing system 600 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the method 300 are performed by the computing system 600. In some examples, the bus 602 is coupled to the processor 604, the display 606, the cursor control component 608, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For examples, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control component 608 (e.g., a mouse, a trackball, or cursor direction keys) is configured to communicate additional information and commands (e.g., to control cursor movements on the display 606) to the processor 604.

According to some embodiments, a method for building software with software action validations, the method comprising: accessing a target object type, the target object type comprising one or more object properties; accessing an action type, the action type comprising one or more action parameters, the action type associating with editing a target object of the target object type; generating a set of validation rules associated with the action type, wherein the set of validation rules comprise a local validation rule associated with a rule parameter, wherein the rule parameter is corresponding to at least one selected from a group consisting of the one or more object properties of the target object type, the one or more action parameters of the action type, and one or more object properties of a second object type associated with the action type, wherein the second object type is different from the target object type; and building a software application, wherein the software application comprises the target object type, the action type, and the set of validation rules; wherein the method is performed using one or more processors. For example, the method is implemented according to at least FIG. 1, FIG. 2, and/or FIG. 3.

In some embodiments, the method further comprises presenting one or more configurations associated with the rule parameter of the local validation rule; and receiving an input to the one or more configurations from the user; wherein the generating a set of validation rules comprises generating the local validation rule based on the input to the one or more configurations. In certain embodiments, the one or more configurations associated with the rule parameter of the local validation rule comprise a first configuration associated with the one or more object properties of the target object type. In some embodiments, the one or more configurations associated with the rule parameter of the local validation rule comprise a second configuration associated with the one or more object properties of the second object type, the second object type being associated with the target object type for the action type.

In certain embodiments, the method further comprises: accessing one or more operator characteristics associated with the action type; wherein the generating a set of validation rules comprises generating the local validation rule based upon the one or more operator characteristics. In some embodiments, the set of validation rules further comprise a global validation rule associated with the action type, wherein the global validation rule is applicable to an action of the action type, wherein the local validation rule is not applicable to the action of the action type. In certain embodiments, the software application is a first software application, wherein the first software application includes a first local validation rule in the set of validation rules, wherein the method comprises: building a second software application, wherein the second software application does not include the first local validation rule. In some embodiments, the method further comprises: generating an action log object comprising at least one of the one or more object properties and at least one of the one or more action parameters, the action log object further comprising a workflow context associated with an action of the action type; and wherein the software application further comprises the action log object.

According to certain embodiments, a system for building software with software action validations, the system comprising: one or more memories comprising instructions stored thereon; and one or more processors configured to execute the instructions and perform operations comprising: accessing a target object type, the target object type comprising one or more object properties; accessing an action type, the action type comprising one or more action parameters, the action type associating with editing a target object of the target object type; generating a set of validation rules associated with the action type, wherein the set of validation rules comprise a local validation rule associated with a rule parameter, wherein the rule parameter is corresponding to at least one selected from a group consisting of the one or more object properties of the target object type, the one or more action parameters of the action type, and one or more object properties of a second object type associated with the action type, wherein the second object type is different from the target object type; and building a software application, wherein the software application comprises the target object type, the action type, and the set of validation rules. For example, the system is implemented according to at least FIG. 1, FIG. 2, and/or FIG. 3.

In some embodiments, the operations further comprise presenting one or more configurations associated with the rule parameter of the local validation rule; and receiving an input to the one or more configurations from the user; wherein the generating a set of validation rules comprises generating the local validation rule based on the input to the one or more configurations. In certain embodiments, the one or more configurations associated with the rule parameter of the local validation rule comprise a first configuration associated with the one or more object properties of the target object type. In some embodiments, the one or more configurations associated with the rule parameter of the local validation rule comprise a second configuration associated with the one or more object properties of the second object type, the second object type being associated with the target object type for the action type.

In certain embodiments, the operations further comprise: accessing one or more operator characteristics associated with the action type; wherein the generating a set of validation rules comprises generating the local validation rule based upon the one or more operator characteristics. In some embodiments, the set of validation rules further comprise a global validation rule associated with the action type, wherein the global validation rule is applicable to an action of the action type, wherein the local validation rule is not applicable to the action of the action type. In certain embodiments, the software application is a first software application, wherein the first software application includes a first local validation rule in the set of validation rules, wherein the method comprises: building a second software application, wherein the second software application does not include the first local validation rule. In some embodiments, the operations further comprise: generating an action log object comprising at least one of the one or more object properties and at least one of the one or more action parameters, the action log object further comprising a workflow context associated with an action of the action type; and wherein the software application further comprises the action log object.

According to certain embodiments, a method for software action validations, the method comprising: accessing a target object of a target object type, the target object type comprising one or more object properties; receiving data associated with an action of an action type, the action type comprising one or more action parameters, the action type associating with editing an object of the target object type; and validating the action using a set of validation rules associated with the action type, wherein the set of validation rules comprise a local validation rule associated with a rule parameter, wherein the rule parameter is corresponding to at least one selected from a group consisting of the one or more object properties of the target object type, the one or more action parameters of the action type, and one or more object properties of a second object type associated with the action type, wherein the second object type is different from the target object type; wherein the method is performed using one or more processors. For example, the method is implemented according to at least FIG. 1, FIG. 2, and/or FIG. 4.

In some embodiments, the action is a first action, wherein the set of validation rules further comprise a global validation rule associated with the action type, wherein the global validation rule is applicable to a second action of the action type, wherein the local validation rule is not applicable to the second action of the action type. In certain embodiments, the validating the action using a set of validation rules comprises: validating the first action using the global validation rule; and validating the first action using the local validation rule. In some embodiments, the method further comprises: receiving one or more operator characteristics associated with the action; wherein the validating the action using a set of validation rules comprises validating the action using the set of validation rules based on the one or more operator characteristics.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method for building software with software action validations, the method comprising:
    accessing a data structure of a target object type, the target object type comprising one or more object properties;
    accessing a data structure of an action type, the action type comprising one or more action parameters, the action type associating with editing a target object of the target object type;
    generating a set of validation rules associated with the action type, wherein the set of validation rules comprise a local validation rule associated with a rule parameter, wherein the rule parameter is corresponding to at least one selected from a group consisting of the one or more object properties of the target object type, the one or more action parameters of the action type, and one or more object properties of a second object type associated with the action type, wherein the second object type is different from the target object type;
    building a software application using an application builder, wherein the software application comprises the data structure of the target object type, the data structure of the action type, and the set of validation rules; and
    causing to distribute the software application to run on a computing device;
    wherein the set of validation rules further comprise a global validation rule associated with the action type;
    wherein the global validation rule is applicable to a first action instantiated from the data structure of the action type and a second action instantiated from the data structure of the action type when the software application is running;

wherein the local validation rule is associated with a condition;
wherein the local validation rule is not applicable to the first action instantiated from the data structure of the action type based on the condition when the software application is running;
wherein the local validation rule is applicable to the second action instantiated from the data structure of the action type based on the condition when the software application is running;
wherein the method is performed using one or more processors.

2. The method of claim 1, further comprising:
presenting one or more configurations associated with the rule parameter of the local validation rule; and
receiving an input to the one or more configurations from a user;
wherein the generating a set of validation rules comprises generating the local validation rule based on the input to the one or more configurations.

3. The method of claim 2, wherein the one or more configurations associated with the rule parameter of the local validation rule comprise a first configuration associated with the one or more object properties of the target object type.

4. The method of claim 3, wherein the one or more configurations associated with the rule parameter of the local validation rule comprise a second configuration associated with the one or more object properties of the second object type, the second object type being associated with the target object type for the action type.

5. The method of claim 1, further comprising:
accessing one or more operator characteristics associated with the action type;
wherein the generating a set of validation rules comprises generating the local validation rule based upon the one or more operator characteristics.

6. The method of claim 1, wherein the software application is a first software application, wherein the first software application includes a first local validation rule in the set of validation rules, wherein the method comprises:
building a second software application, wherein the second software application does not include the first local validation rule.

7. The method of claim 1, further comprising:
generating an action log object comprising at least one of the one or more object properties and at least one of the one or more action parameters, the action log object further comprising a workflow context associated with an action of the action type; and
wherein the software application further comprises the action log object.

8. A system for building software with software action validations, the system comprising:
one or more memories comprising instructions stored thereon; and
one or more processors configured to execute the instructions and perform operations comprising:
accessing a data structure of a target object type, the target object type comprising one or more object properties;
accessing a data structure of an action type, the action type comprising one or more action parameters, the action type associating with editing a target object of the target object type;
generating a set of validation rules associated with the action type, wherein the set of validation rules comprise a local validation rule associated with a rule parameter, wherein the rule parameter is corresponding to at least one selected from a group consisting of the one or more object properties of the target object type, the one or more action parameters of the action type, and one or more object properties of a second object type associated with the action type, wherein the second object type is different from the target object type;
automatically building a software application using an application builder, wherein the software application comprises the data structure of the target object type, the data structure of the action type, and the set of validation rules; and
causing to distribute the software application to run on a computing device;
wherein the set of validation rules further comprise a global validation rule associated with the action type;
wherein the global validation rule is applicable to a first action instantiated from the data structure of the action type and a second action instantiated from the data structure of the action type when the software application is running;
wherein the local validation rule is associated with a condition;
wherein the local validation rule is not applicable to the first action instantiated from the data structure of the action type based on the condition when the software application is running;
wherein the local validation rule is applicable to the second action instantiated from the data structure of the action type based on the condition when the software application is running.

9. The system of claim 8, wherein the operations further comprise:
presenting one or more configurations associated with the rule parameter of the local validation rule; and
receiving an input to the one or more configurations from a user;
wherein the generating a set of validation rules comprises generating the local validation rule based on the input to the one or more configurations.

10. The system of claim 9, wherein the one or more configurations associated with the rule parameter of the local validation rule comprise a first configuration associated with the one or more object properties of the target object type.

11. The system of claim 10, wherein the one or more configurations associated with the rule parameter of the local validation rule comprise a second configuration associated with the one or more object properties of the second object type, the second object type being associated with the target object type for the action type.

12. The system of claim 8, wherein the operations further comprise:
accessing one or more operator characteristics associated with the action type;
wherein the generating a set of validation rules comprises generating the local validation rule based upon the one or more operator characteristics.

13. The system of claim 8, wherein the software application is a first software application, wherein the first software application includes a first local validation rule in the set of validation rules, wherein the operations further comprise:
building a second software application, wherein the second software application does not include the first local validation rule.

14. The system of claim 8, wherein the operations further comprise:

generating an action log object comprising at least one of the one or more object properties and at least one of the one or more action parameters, the action log object further comprising a workflow context associated with an action of the action type; and wherein the software application further comprises the action log object.

15. A method for software action validations, the method comprising:

accessing a target object of a target object type, the target object type comprising one or more object properties;

receiving data associated with a first action of an action type, the action type comprising one or more action parameters, the action type associating with editing an object of the target object type; and validating the action using a set of validation rules associated with the action type, wherein the set of validation rules comprise a local validation rule associated with a rule parameter, wherein the rule parameter is corresponding to at least one selected from a group consisting of the one or more object properties of the target object type, the one or more action parameters of the action type, and one or more object properties of a second object type associated with the action type, wherein the second object type is different from the target object type;

wherein the set of validation rules further comprise a global validation rule associated with the action type;

wherein the global validation rule is applicable to a first action instantiated from the data structure of the action type and a second action instantiated from the data structure of the action type when the software application is running;

wherein the local validation rule is associated with a condition;

wherein the local validation rule is not applicable to the first action instantiated from the data structure of the action type based on the condition when the software application is running;

wherein the local validation rule is applicable to the second action instantiated from the data structure of the action type based on the condition when the software application is running;

wherein the method is performed using one or more processors.

16. The method of claim 15, wherein the action is a first action, wherein the set of validation rules further comprise a global validation rule associated with the action type, wherein the global validation rule is applicable to a second action of the action type, wherein the local validation rule is not applicable to the second action of the action type.

17. The method of claim 16, wherein the validating the action using a set of validation rules comprises:

validating the first action using the global validation rule; and validating the first action using the local validation rule.

18. The method of claim 15, further comprising:

receiving one or more operator characteristics associated with the action;

wherein the validating the action using a set of validation rules comprises validating the action using the set of validation rules based on the one or more operator characteristics.

* * * * *